United States Patent
Baetz

[11] 3,876,639
[45] Apr. 8, 1975

[54] THIAZOLINO-PYRIMIDIN-5-ONE DERIVATIVES, PROCESS FOR THEIR PREPARATION AND APPLICATIONS THEREOF

[75] Inventor: Jacques Baetz, La Garenne-Columbes, France

[73] Assignee: Seperic, Morat (Canton de Fribourg), Switzerland

[22] Filed: Aug. 14, 1972

[21] Appl. No.: 280,165

[30] Foreign Application Priority Data
Aug. 24, 1971 United Kingdom............... 39585/71

[52] U.S. Cl.......... 260/251 A; 260/305; 260/306.7; 424/251
[51] Int. Cl............................................ C07d 51/46
[58] Field of Search.............................. 260/251 A

[56] References Cited
OTHER PUBLICATIONS
Brown, et al. - J. Chem. Soc. 1971 C, (8), 1527–8.
Pashkurov, et al. - C. A. 71, 13088a (1969).
Matsunaga, et al. - Yakugaku Zasshi 88(8), 1003–1010 (1968), - Abstract thereof.

Primary Examiner—Donald G. Daus
Assistant Examiner—Raymond V. Rush
Attorney, Agent, or Firm—Young & Thompson

[57] ABSTRACT

Said derivatives are those of the general formula:

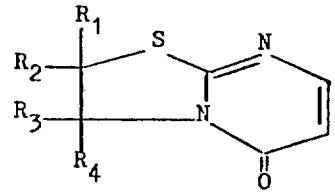

in which $R_1$, $R_2$, $R_3$ and $R_4$ are each hydrogen, an alkyl group or an aryl group, one at least of said symbols being other than hydrogen, or $R_2$ and $R_3$ form together a group $(CH_2)_n$, $n$ being equal to 3, 4 or 5, and their acid addition salts. They are therapeutically useful, in particular as analgesic drugs.

7 Claims, 2 Drawing Figures

THIAZOLINO-PYRIMIDIN-5-ONE DERIVATIVES, PROCESS FOR THEIR PREPARATION AND APPLICATIONS THEREOF

This invention relates to a series of new chemical compounds endowed with therapeutic, particularly analgesic, properties.

Figure 1:
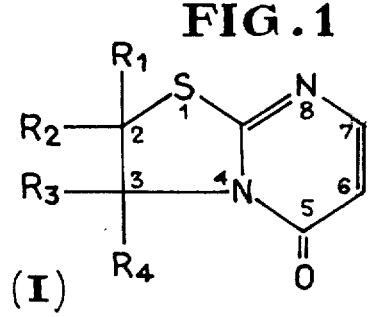

These compounds (I) are those of the general formula illustrated in FIG. 1 of the accompanying drawing, in which $R_1$, $R_2$, $R_3$ and $R_4$ are each hydrogen, an alkyl group or an aryl group, one at least of said symbols being other than hydrogen, or else $R_2$ and $R_3$ form together a $(CH_2)_n$ group, $n$ being equal to 3, 4 or 5, and their acid addition salts, particularly with pharmaceutically acceptable acids.

Thus, compounds (I) are 2- and/or 3-substituted thiazolino-pyrimidin-5-ones. It should be noted that such substitutions may produce stereoisomers and the invention includes within its scope both the racemic forms and the optically active forms.

The alkyl and aryl groups that may be represented by symbols $R_1$ to $R_4$ are preferably lower alkyl and monocyclic aryl groups, respectively.

Figure 2:
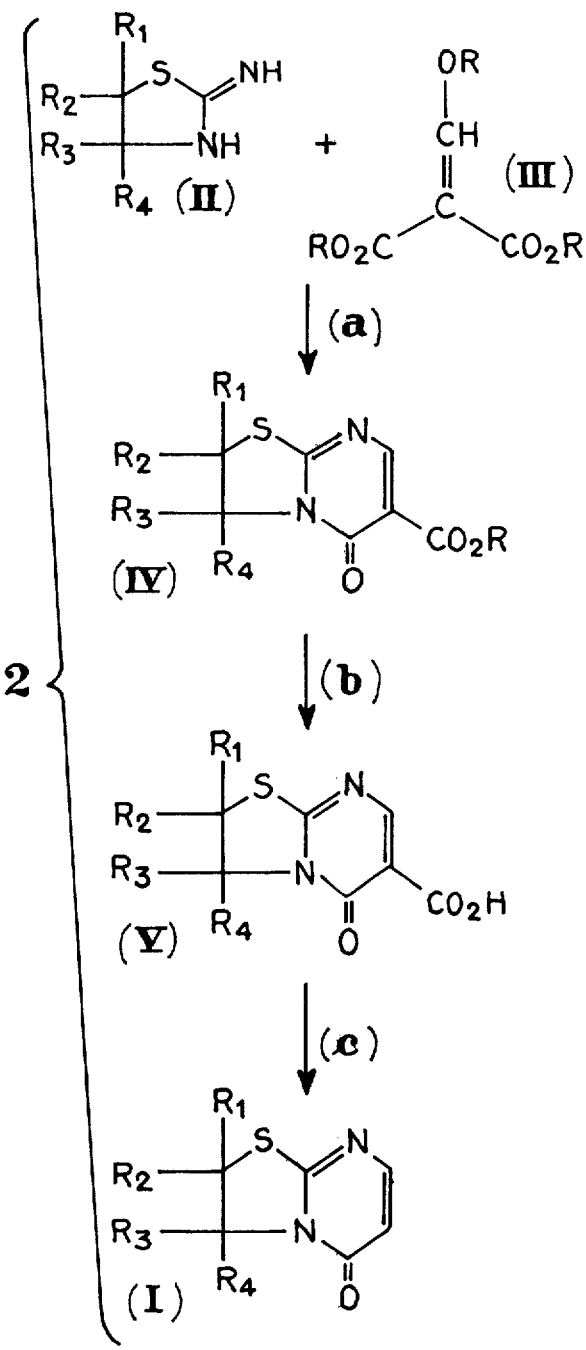

To prepare compounds (I), a process illustrated in FIG. 2 of the accompanying drawing may be used.

This process comprises condensing a 2-iminothiazolidine (II) in which $R_1$, $R_2$, $R_3$ and $R_4$ have the above-defined meanings, with an alkyl alkoxymethylene malonate (III), in which R is a lower alkyl group, particularly an ethyl group, then hydrolyzing resulting ester (IV), decarboxylating acid (V) and then, if desired, salifying resulting compound (I).

Imino-thiazolidine (II) may be used in free or salt form. In the latter case, the imine is released in situ by means of an alkaline compound. The condensation between imino-thiazolidine (II) and alkyl alkoxymethylene-malonate (III) is advantageously conducted within an organic solvent such as ethanol. Hydrolysis of ester (IV) is carried out in conventional manner, such as by refluxing in formic acid in the presence of methane-sulfonic acid. Decarboxylation of acid (V) is also conducted in a known manner, such as by heating in the presence of copper oxide.

Intermediate compounds (IV) and (V) are themselves new compounds.

The following non-limiting examples illustrate the invention.

EXAMPLE 1

Synthesis of 2,3-dihydro-3-methyl-thiazolo(3.2.a)pyrimidin-5-one (Formula (I): $R_1 = R_2 = R_4 = H$; $R_3 = CH_3$. Code N°: 771).

a. Preparation of ethyl 2,3-dihydro-3-methyl-5-oxothiazolo-(3.2.a)pyrimidine-6-carboxylate (formula (IV): $R_1 = R_2 = R_4 = H$; $R_3 = CH_3$; $R = C_2H_5$).

Into a 1 litre flask are added 58 g of 2-imino-4-methyl-thiazolidine (Formula (II): $R_1 = R_2 = R_4 = H$; $R_3 = CH_3$), 108 g of ethyl ethoxy-methylene-malonate (formula (III)) and 500 ml of ethanol. The resulting pale yellow solution is refluxed during 4 hours, after which it is allowed to cool and is then placed over an ice-bath and is left overnight in the refrigerator. The material which has set to a mass is suction filtered, washed twice with ethyl ether and is then dried, to give 107 g of ester, m.p. 140°–142°C.

| Analysis: Total nitrogen: | Calculated | 11.66% |
|---|---|---|
| | Found | 11.67% | b. Preparation of 2,3-dihydro-3-methyl-5-oxo-thiazolo(3.2.a)-pyrimidine-6-carboxylic acid (Formula (V): $R_1 = R_2 = R_4 = H$; $R_3 = CH_3$).

Into a 2 litre flask are added 100 g of the above ester, 77 g of methane-sulfonic acid and 800 ml of 90% formic acid. This solution is refluxed during 4 hours. After cooling, it is poured into a 5 litre Erlenmeyer flask to which 3 litres of water are added, with stirring. Stirring is continued during a further hour, and the reaction mixture is then left in the refrigerator during 48 hours. It is then suction filtered, washed with ice-cold distilled water and dried in a vacuum oven at 50°C, to give 61 g of acid, m.p. = 159°–160°C.

| Analysis: Total nitrogen: | Calculated | 13.20% |
|---|---|---|
| | Found | 13.25% | c. Preparation of 2,3-dihydro-3-methyl-thiazolo(3.-2.a)pyrimidin-5-one 60 g of the above acid and 11 g of copper oxide are intimately mixed in a 250 ml flask, and are then placed in an alloy bath at 170°C. When the mixture is completely melted, the temperature of the bath is brought up to 270°C within 15 minutes. The reaction is complete within 5 minutes at 270°C. After maintaining a further ten minutes at 270°–280°C, the reaction mixture is allowed to cool and is then taken up into 200 ml of chloroform, treated with charcoal in the hot, filtered through hyflosupercel, washed four times with hot chloroform, after which the maximum amount of chloroform is removed using a rotary evaporator. The resulting brown product is distilled at 245°–250°C and is then dissolved in ethanol, treated with charcoal, filtered, washed with ethanol and then left aside in the refrigerator during 2.5 hours, after which it is suction filtered, washed with ethanol and dried, to give 27 g of material m.p. = 99° C.

| Analysis: Total nitrogen: | Calculated | 16.65% |
|---|---|---|
| | Found | 16.52% | d. Preparation of 2,3-dihydro-3-methyl-thiazolo(3.-2.a)pyrimidin-5-one d-camphorsulfonate(Code N° : 882).

4.2 g of the product (N° 771) obtained according to Example 1 above are dissolved in acetone (20 ml) at 35°–40°C. 5.8 g of d-camphorsulfonic acid are then added thereto portionwise. There is first obtained a homogeneous solution which subsequently sets to a mass. The resulting material is cooled during four hours over an ice-bath, after which it is suction filtered, washed twice with acetone and then dried in a desiccator over potassium hydroxide, to give 7.6 g of material F = 147°C.

| Analysis: Total nitrogen: | Calculated | 6.99% |
|---|---|---|
| | Found | 7% |

$[\alpha]_D^{20} = +25.08°$ (c = 3.5%, ethanol).

EXAMPLE 2

Synthesis of 2,3-dihydro-2-methyl-thiazolo(3.2.a)pyrimidin-5-one (Formula (I): $R_1 = R_3 = R_4 = H$; $R_2 = CH_3$. Code N° 812).

a. Preparation of ethyl 2,3-dihydro-2-methyl-5-oxo(3.2.a)pyrimidine-6-carboxylate (Formula (IV): $R_1 = R_3 = R_4 = H$; $R_2 = CH_3$; $R = C_2H_5$).

2-Imino-5-methyl-thiazolidine (Formula (II): $R_1 = R_3 = R_4 = H$; $R_2 = CH_3$; HBr) (18 g) is dissolved in ethanol (50 ml) while warming. When the solution is complete, 2.24N alcoholic potassium hydroxide (39ml) is added thereto, with stirring, during 30 minutes. The reaction mixture is then cooled and the resulting potassium bromide is filtered off. The ethanol solution is concentrated to 70 ml. Ethyl ethoxy-methylene-malonate (20 ml) is added thereto, and it is then refluxed during 2.5 hours. Crystallization occurs on cooling. The material is left aside overnight in the refrigerator and is then suction filtered, washed with ethyl ether and dried, to give 16 g of product, m.p. = 129°–130°C.

| Analysis: Total nitrogen: | Calculated | 11.66% |
|---|---|---|
| | Found | 11.64% | b. Preparation of 2,3-dihydro-2-methyl-5-oxo-thiazolo(3.2.a) pyrimidine-6-carboxylic acid (Formula (V): $R_1 = R_3 = R_4 = H$; $R_2 = CH_3$).

From 16 g of the above ester, 13 g of methane-sulfonic acid and 130 ml of formic acid, using the procedure of Example 1 (b), to give 12 g of acid, m.p. = 153°–155°C.

| Analysis: Total nitrogen: | Calculated | 13.20% |
|---|---|---|
| | Found | 13.06% | c. Preparation of 2,3-dihydro-2-methyl-thiazolo(3.-2.a)-pyrimidin-5-one.

From 11 g of the above acid and 2.2 g of copper oxide, using the procedure of Example 1 (c) to give 4 g of product, m.p.=106°–107°C.

| Analysis: Total nitrogen: | Calculated | 16.65% |
|---|---|---|
| | Found | 16.60% |

EXAMPLE 3

Synthesis of 2,3-dihydro-2-phenyl-thiazolo(3.2.a)pyrimidin-5-one (Formula (I): $R_1 = R_3 = R_4 = H$; $R_2 = C_6H_5$. Code N° 815).

a. Preparation of ethyl 2,3-dihydro-2-phenyl-5-oxo-thiazolo-(3.2.a)pyrimidine-6-carboxylate (Formula (IV): $R_1 = R_3 = R_4 = H$; $R_2 = C_6H_5$; $R = C_2H_5$).

45 g of 2-imino-5-phenyl-thiazolidine hydrochloride (formula (II): $R_1 = R_3 = R_4 = H$; $R_2 = C_6H_5$; HCl) are suspended in ethanol (200 ml). Alcoholic potassium hydroxide (100 ml, 2N) is added thereto and the mixture is stirred during 45 minutes. The resulting potassium chloride is suction filtered and washed with ethanol. 44 g of ethyl ethoxy-methylene-malonate are added to the filtrate which is then refluxed during 2 hours and left overnight in the refrigerator. The material is suction filtered, washed with ethanol and dried in an oven at 45°C. It is then recrystallized from ethanol, to give 47 g of ester, m.p. = 120°–122°C.

| Analysis: Total nitrogen: | Calculated | 9.26% |
|---|---|---|
| | Found | 9.10% | b. Preparation of 2,3-dihydro-2-phenyl-5-oxo-thiazolo(3.2.a)pyrimidine-6-carboxylic acid (Formula (V): $R_1 = R_3 = R_4 = H$; $R_2 = C_6H_5$).

40 g of the above ester are dissolved in 550 ml of 90% formic acid and 26 g of methane-sulfonic acid. The resulting solution is refluxed during 4 hours. It is allowed to revert to room temperature, after which 1,500 ml of distilled water are added thereto, with stirring. Crystallization occurs. The reaction mixture is left overnight in the refrigerator after which it is suction filtered, washed with water, with ethanol and dried in an oven at 70°C over potassium hydroxide. After recrystallization from ethanol-acetone, the resulting material is suction filtered, washed twice with ethanol and dried in an oven at 70°C, to give 26 g of acid, m.p. = 166°–168°C.

| Analysis: Total nitrogen: | Calculated | 10.21% |
|---|---|---|
| | Found | 10.04% | c. Preparation of 2,3-dihydro-2-phenyl-thiazolo(3.-2.a)pyrimidin-5-one.

20 g of the above acid and 3 g of copper oxide are intimately mixed in a 50 ml flask. Heating over an alloy bath is conducted as follows: the flask is placed at 130°C; after 5 minutes, the temperature is at 150°C; after 10 minutes: 200°C; after 15 minutes: 240°C; after 20 minutes, at the temperature of 260°C, a substantial amount of gas is evolved; after 25 minutes, at 280°C, heating is discontinued. The residue is taken up into 500 ml of chloroform, treated with carbon black and filtered. The filtrate is brought to dryness. The resulting oil is distilled over the alloy bath at 250°–260°C. The distillation temperature is 210°–214°C. 12 g of product, m.p. = 99°–101°C are collected.

| Analysis: Total nitrogen: | Calculated | 12.16% |
| --- | --- | --- |
| | Found | 12.03 |

EXAMPLE 4

Synthesis of 5a,6,7,8,9,9a-Hexahydro-4-oxo-4H pyrimido(2.1.b)-benzothiazole (Formula (I): $R_1 = R_4 = H$; $R_2 + R_3 = -(CH_2)_4$. Code N° 846)

a+b. Preparation of 5a,6,7,8,9,9a-hexahydro-4-oxo-4H pyrimido (2.1.b)benzothiazole-3-carboxylic acid (Formula (V) : $R_1 = R_4 = H$; $R_2 + R_3 = -(CH_2)_4$).

2-Amino-hexahydro-benzothiazole hydrochloride (1.92g) prepared in known manner is dissolved in ethanol (20 ml) and 0.5N alcoholic potassium hydroxide (19.5 ml) is added thereto. Potassium chloride precipitates out, and is then filtered and washed with alcohol. Ethyl ethoxy-methylene-malonate (2.16 g) is added to the filtrate and the resulting material is refluxed during 2 hours. It is then brought to dryness in vacuo. To the resulting oil are added 25 ml of 90% formic acid and 2.175 g of methanesulfonic acid, and the reaction mixture is refluxed during two hours. It is then brought to dryness in vacuo, and a 2.5% aqueous sodium acetate solution (40 ml) is then added thereto. The precipitate is filtered off, washed with water and dried in vacuo, to give 1.98 g of product, m.p. 181°–182°C.

| Analysis: Total nitrogen: | Calculated | 11.10% |
| --- | --- | --- |
| | Found | 11.02% | c. Preparation of 5a,6,7,8,9,9a-Hexahydro-4-oxo- 4H pyrimido (2.1.b)benzothiazole Into a flask is added a mixture of 8.9 g of the above carboxylic acid and 1.4 g cupric oxide. The flask is immersed in an alloy bath at 160°–180°C. The temperature is brought up to 240°C within 5 to 7 minutes. Decarboxylation begins at about 240°–250°C, and the reaction mixture is maintained during 5 minutes between 260° and 290°C, after which it is cooled. The residue is taken up into 50 ml of chloroform, filtered over clarcel and washed with chloroform. It is then distilled in vacuo, over an alloy bath at 210°–250°C. The distillate sets to a beige mass which is dissolved in 45 ml of boiling ethanol. On concentration in vacuo, the product crystallizes, after which it is left overnight in the refrigerator, suction filtered, washed with cold ethanol and dried in vacuo over potassium hydroxide, to give 5.3 g of product, m.p. 135°C.

| Analysis: Total nitrogen: | Calculated | 13.45% |
| --- | --- | --- |
| | Found | 13.25% |

EXAMPLE 5

Preparation of (−)-2,3-dihydro-3-methyl-thiazolo(3.2.a)-pyrimidin-5-one (Code N° 855)

19.9 g of racemate N° 771 obtained according to example 1 are dissolved in 135 ml of lukewarm ethanol. Pure crystalline L(+)-tartaric acid (16.9 g) is then added thereto portionwise. The resulting solution is filtered and washed with ethanol. It is then cooled and left standing during 71 hours at −25°C. It is then dried in vacuo, at room temperature, to give 9 g of product, m.p. 102°–104°C.

| Analysis: Total nitrogen: | Calculated | 16.65% |
| --- | --- | --- |
| | Found | 16.61% |

$[\alpha]_D^{25} = -2.2°$ (c = 4.3%, methanol).

The constitution and physical properties of compounds (I) obtained according to the examples described above and of other compounds (I) prepared in a similar manner are summarized in the following Table. In this Table are also reported data relating to the analgesic activity of compounds (I), as determined by one of the conventional testing procedures for this activity, the "writhing test."

Mice are given a single intraperitoneal injection of 0.2 ml of 0.6% acetic acid. The compound (I) to be tested is administered orally at a dosage from 1 to 20 mg/kg, one half-hour prior to acetic acid injection. The number of characteristic writhing movements induced by pain is counted during the 15 minutes which follow the acetic acid injection.

The magnitude of the action of each compound described is expressed using from one to four +'s, four +'s representing maximum activity.

| Code N°. | $R_1$ | $R_2$ | $R_3$ | $R_4$ | m.p. (tube),°C | Activity |
| --- | --- | --- | --- | --- | --- | --- |
| 771 | H | H | $CH_3$ | H | 99° | ++++ |
| 786 | H | H | $C_2H_5$ | H | 60–62° | +++ |
| 812 | H | $CH_3$ | H | H | 106–107° | ++++ |
| 815 | H | $C_6H_5$ | H | H | 99–101° | ++ |
| 820 | H | $C_6H_5$ | $CH_3$ | H | 98–100° | + |
| 834 | $CH_3$ | $CH_3$ | H | H | 116–118° | ++ |
| 846 | H | $CH_2CH_2$ | $CH_2CH_2$ | H | 135° | +++ |
| 855 | H | H | $CH_3$ | H | 102–104° | ++++ |
| | enantiomer (−) of derivative n° 771 | | | | | |
| 882 | H | H | $CH_3$ | H | 147 | ++++ |
| | d-camphorsulfonic salt of derivative n° 771 | | | | | |

The analgesic activity of compounds (I) makes their application in human medicine possible, said compounds being administrable by the oral, parenteral or rectal route at a daily dosage regimen generally comprised between 100 mg and 900 mg.

For such administration, compounds (I) are formulated as therapeutic compositions, with the vehicles or excipients suitable for these various routes of administration.

The compositions in unit dosage form, such as tablets, suppositories and ampoules contain preferably from 100 mg to 300 mg of compound (I).

Having now described my invention, what I claim as new and desire to secure by Letters Patent is:

1. Thiazolino-pyrimidin-5-one derivative selected from those having the formula

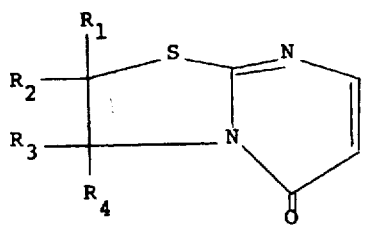

in which $R_1$ and $R_4$ are each selected from hydrogen, lower alkyl and phenyl, and $R_2$ and $R_3$ are each selected: (a) from hydrogen, lower alkyl and monocyclic aryl and (b) from radicals such that they form together a group $(CH_2)_n$, $n$ being selected from 3, 4 and 5, one at least of substituents $R_1$, $R_2$, $R_3$ and $R_4$ being other than hydrogen, and a pharmaceutically acceptable acid addition salt thereof.

2. 2,3-Dihydro-3-methyl-thiazolo(3.2.a)-pyrimidin-5-one and its pharmaceutically acceptable acid addition salts.

3. (−)-2,3-Dihydro-3-methyl-thiazolo(3.2.a)pyrimidin-5-one and its pharmaceutically acceptable acid addition salts.

4. 2,3-Dihydro-3-methyl-thiazolo(3.2.a)pyrimidin-5-one d-camphorsulfonate.

5. 2,3-Dihydro-2-methyl-thiazolo(3.2.a)pyrimidin-5-one and its pharmaceutically acceptable acid addition salts.

6. 2,3-Dihydro-3-ethyl-thiazolo(3.2.a)pyrimidin-5-one and its pharmaceutically acceptable acid addition salts.

7. 5a,6,7,8,9,9a-Hexahydro-4-oxo- 4H pyrimido(2.1.b)-benzothiazole and its pharmaceutically acceptable acid addition salts.

* * * * *